(12) United States Patent
Tietjen

(10) Patent No.: US 6,990,260 B2
(45) Date of Patent: Jan. 24, 2006

(54) EXTENDED INTENSITY-BASED OPTICAL SENSOR

(75) Inventor: Byron W. Tietjen, Baldwinsville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/863,965

(22) Filed: Jun. 9, 2004

(65) Prior Publication Data

US 2005/0276534 A1      Dec. 15, 2005

(51) Int. Cl.
  *G02B 6/00* (2006.01)
(52) U.S. Cl. .......................... 385/12; 385/1; 359/237; 359/238; 359/285; 359/286; 359/287; 73/170.33
(58) Field of Classification Search .................... 385/1, 385/2, 4, 12, 13; 359/237, 238, 285–287; 73/170.33; 367/106, 131, 134, 154, 155
See application file for complete search history.

(56) References Cited

U.S. PATENT DOCUMENTS

| | | | | |
|---|---|---|---|---|
| 4,525,818 A | * | 6/1985 | Cielo et al. ................. | 367/149 |
| 4,865,416 A | * | 9/1989 | Pratt ........................... | 385/12 |
| 2001/0055438 A1 | * | 12/2001 | Tweedy et al. ............... | 385/12 |
| 2004/0247223 A1 | * | 12/2004 | Tietjen .......................... | 385/7 |

* cited by examiner

*Primary Examiner*—Frank G. Font
*Assistant Examiner*—Derek L. Dupuis
(74) *Attorney, Agent, or Firm*—Plevy, Howard & Darcy, PC

(57) ABSTRACT

An extended optical sensor comprises a plurality of equally spaced intensity-based point sensors connected in parallel such that the optical path lengths are the same within the extended sensor enclosure. The input to the extended sensor is a single optical fiber as is the output.

11 Claims, 5 Drawing Sheets

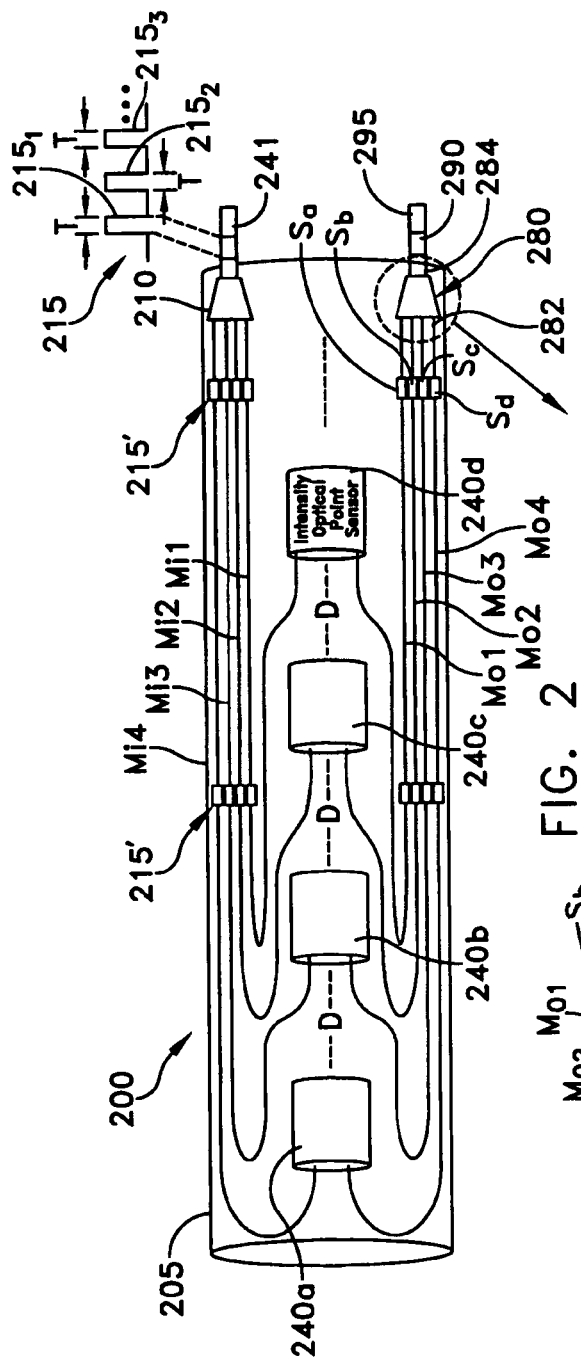
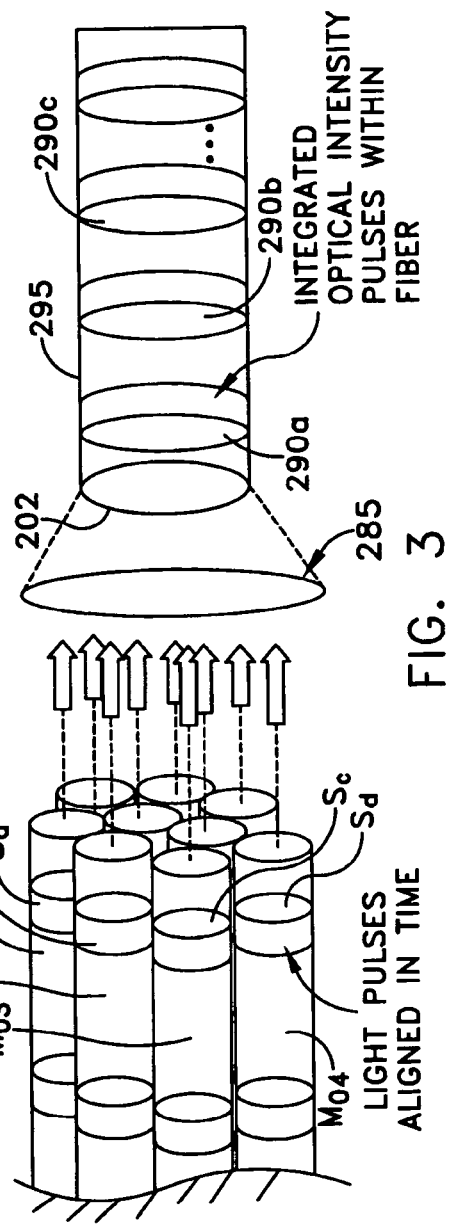
FIG. 2
FIG. 3

EXTENDED INTENSITY-BASED OPTICAL SENSOR

RELATED APPLICATIONS

This application is related to copending U.S. patent application Ser. No. 10/454,440, entitled "System and Method For Multiplexing Optical Sensor Array Signals" filed Jun. 4, 2003, and assigned to Lockheed Martin Corporation, the assignee herein.

FIELD OF THE INVENTION

The present invention relates generally to the field of sensor systems and more particularly, to fiber optic acoustic sensor arrays employing point sensors that cooperate to form a single extended sensor system.

BACKGROUND OF THE INVENTION

Fiber optic-based acoustic sensors represent promising alternatives to conventional electronic sensors. Advantages of fiber optic sensors include high sensitivity, large dynamic range, lightweight and compact size.

Fiber optic sensors may be utilized in various sensing applications, but are particularly useful in undersea applications such as towed array sonar systems employing numerous pressure sensors or hydrophones positioned at predetermined locations along a cable. Here, acoustic waves propagating through a medium such as water are incident on an optical fiber which result in corresponding changes in length and index of refraction of the fiber. Such environmental changes in turn cause changes in one or more characteristics of the light signal, such as a change in the intensity, phase and/or polarization of a light pulse propagating through the fiber. An optical sensor comprising a coil of optical fiber exposed to the medium whose physical parameters are to be measured is often utilized. While phase modulated sensors have been employed for sensing various changes in environmental characteristics, it is also desirable to utilize intensity modulated optical devices. Furthermore, it is often desirable to employ a sensor which is extended in length in order to reduce (e.g. via averaging over the length of the sensor) noise components, such as boundary layer noise.

A method and apparatus for providing an extended optical sensor comprising a series of intensity-based point sensors is highly desired.

SUMMARY OF THE INVENTION

An extended optical sensor comprises a plurality of equally spaced intensity-based point sensors connected in parallel such that the optical path lengths are the same within the extended sensor enclosure. The input to the extended sensor is a single optical fiber as is the output.

In one configuration, an extended optical sensor comprises a plurality of intensity-based optical point sensors spaced apart from one another at designated positions along a length of cable. Each point sensor comprises an input coupled to a respective first optical pathway conveying an optical signal to the input of said point sensor, and an output for providing an intensity modulated output optical signal indicative of a sensed environmental condition, said output of each sensor coupled to a respective second optical pathway conveying each intensity modulated output optical signal to an output end thereof. An optical coupler having an input for receiving the intensity modulated output optical signals from each of the output ends of the second optical pathways and an output for providing an output signal indicative of the aggregate of the intensity modulated output optical signal. The first and second optical pathways coupled to a respective optical sensor signal have a combined total path length that differs from the combined total path lengths of the other first and second optical pathways in accordance with the position of the associated optical point sensor to compensate for propagation delays of the optical signal through the respective optical sensor and associated first and second optical pathways such that each of the intensity modulated optical signals, upon input to the coupler, are temporally aligned with one another.

The extended optical sensor further includes an optical coupler disposed near an input end of said cable for receiving an optical signal input to said cable and an outputting to each of said first optical pathways said same optical signal. The first optical pathways may have slightly different path lengths in accordance with the position of the associated optical sensor to provide the same optical signal to the input of each said optical sensor at substantially the same time, and wherein the second optical pathways have different path lengths in accordance with the position of the associated optical sensor along the cable serves to provide the intensity modulated optical signals input to the coupler at substantially the same time.

BRIEF DESCRIPTION OF THE DRAWINGS

FIG. 2 is an exemplary block diagram of an extended optical sensor according to an embodiment of the present invention.

FIG. 3 is an exemplary illustration of a coupling arrangement for the extended optical sensor according to an aspect of the present invention.

DETAILED DESCRIPTION

In accordance with an embodiment of the present invention, an extended optical sensor comprises a plurality of spaced apart intensity-based optical point sensors connected in parallel such that their respective optical path lengths are the same within the extended sensor enclosure. In one configuration, the intensity-based optical point sensor are equally spaced apart from one another by a given distance D, which is substantially shorter than the propagation delay time for the optical signals through the respective fibers. Note that there is no requirement for such equally spaced distances as long as the overall path lengths within the extended sensor enclosure are substantially the same so as to allow the optical signals output from each of the intensity-based point sensors to be temporally aligned with one another. The extended sensor enclosure has an input for receiving an optical signal carried via a single optical fiber, and an output for conveying an integrated or summed optical signal to another optical fiber or photodetector. The optical signal input to the extended sensor enclosure (such as a cable for a towed array) is distributed via a 1 to N coupler arrangement to each of the individual intensity-based optical point sensors positioned along the cable. The outputs of these point sensors are physically bundled together and focused onto a single optical device, such as another optical fiber or photodetector. This effectively integrates or sums the outputs from all of the individual point sensors, thereby reducing, through averaging over the length of the extended sensor, any boundary layer noise that may exist. The optical path lengths through each of the individual point sensors within the extended sensor enclosure are substantially the same in order not to impart any time shifts between these sensors, so that when the outputs are summed, the individual optical signals are temporally aligned. If non-coherent optical light sources are used, large multi-mode fibers may also be employed.

Figure 1:
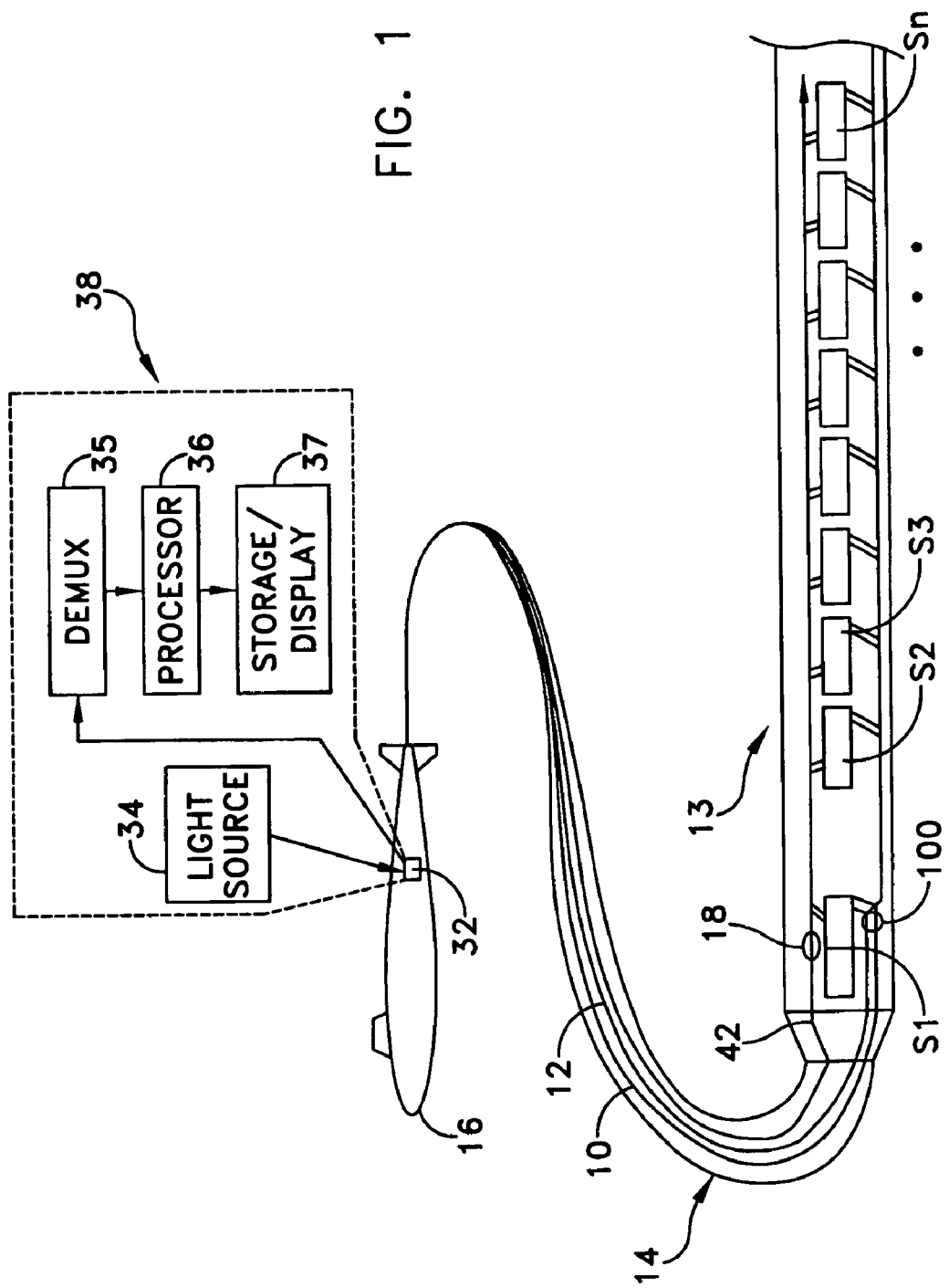
FIG. 1 is an exemplary illustration of an overall towed array system in which is embodied the present invention.

Referring now to FIG. 1, there is shown an exemplary embodiment of a towed fiber optic array with power lines 10 and telemetry lines 12 encased in a tow cable 14 extending from a tow platform 16 such as a surface ship or submarine, to fiber optic array 13. Telemetry and power lines are coupled to fiber optic sensors S1, S2, S3, . . . Sn either directly or indirectly via additional converter arrangements such as electro-optical converters, for example. A fiber optic input line 42 passes through tow cable 14 and couples to each of the sensors S1, S2, S3, . . . Sn via a 1–N fiber optic input coupler 18 and corresponding respective input fiber links. The output from each sensor is sent via a corresponding respective output fiber link for coupling to an N–1 fiber output coupler 100 for transmitting the return signals to signal processing electronics modules on the platform. In one configuration, each of these sensors may represent an extended sensor having therein a series of individual point sensors connected in parallel as described herein. In another configuration, each of the fiber optic sensors S1, S2, S3 illustrated schematically in FIG. 1 comprise individual intensity based optical point sensors connected in parallel to form an extended optical sensor as described herein. Tow platform 16 contains a transmitter/receiver arrangement 32 comprising an optical source 34 for transmitting light pulses to the towed array, and a receiving unit 38 for receiving and processing return signals from the towed array. The receiver may include a processor/demultiplexer 35 to separate and process signals returning to the platform from the towed array 13. The signals are applied to signal processing illustrated as block 36 for producing signals representing organized sensed information, and the organized information is made available for storage and/or display, illustrated as block 37. Note that throughout the drawings, figures are not necessarily drawn to scale, but certain elements and features may be enhanced (while other aspects are diminished) to better illustrate the principles and concepts underlying aspects of the present invention.

Referring now to FIG. 2, there is shown an exemplary embodiment of an extended optical sensor 200 comprising a plurality of intensity-based optical point sensors 240a, 240b, 240c, and 240d positioned within the sensor enclosure or cable 205 such that their location and/or relative separation D from adjacent ones is substantially fixed and equally spaced.

An optical signal 215 carried by input optical fiber 241 and input to cable 205 comprises a series of light pulses as shown in FIG. 2. 1 to N optical coupler 210 coupled to optical fiber 241 splits the input power to pass the same optical signal 215' to each of fiber optic input lines Mi1, Mi2, Mi3, and Mi4. Each of intensity based fiber optic point sensors 240a, 240b, 240c, and 240d has an input coupled to a respective one of the fiber optic input lines and an output coupled to a respective one of fiber optic output lines Mo1, Mo2, Mo3, and Mo4. Each intensity based point sensor is operative for receiving the light pulses of optical signal 215' at an input thereof and for sensing an environmental condition (e.g. acoustic pressure, pressure gradient, acceleration, small physical displacements of the point sensor within the enclosure) and generating an intensity modulated output signal indicative of the sensed environmental condition. The size of a given intensity-based point sensor may vary based on the intended design and application. However, in an exemplary configuration for a towed array sonar sensor, the size of an intensity modulated point sensor is approximately one inch in length and approximately less than one inch in diameter. The range in frequencies of these sensors would be commensurate with the operational frequency requirements of the towed array, which usually cover frequencies between five Hertz (Hz) to several hundred Hz. The distance D may depend upon the frequency range, and the characteristics of the flow noise the sensor is intended to reduce. For typical applications, there could be up to a dozen point sensors for each extended sensor, where the extended sensor will be on the order of one-half of the wavelength of the highest frequency of interest.

The combined optical path lengths associated with each of the intensity based optical point sensors is substantially the same within the extended sensor enclosure to provide a substantially same propagation time through the extended sensor to enable each of the intensity modulated output signals to be temporally aligned with one another for summing at the output of the enclosure 205. In the exemplary embodiment shown in FIG. 2, the optical path lengths for each of the intensity based point sensors comprise the aggregate of the lengths associated with each of the fiber optic input lines (Mi1–Mi4), lengths associated with each of fiber optic output lines (Mo1–Mo4), and any propagation delay corresponding to the propagation distance through respective sensors 240a–240d. While the overall aggregate path length associated with each point sensor need not be identical, the aggregate path lengths must be sufficiently close to one another within a predetermined tolerance range (e.g. 75%–99%) which may be a function of the amount of expansion or broadening of the optical pulse as it propagates along the optical pathways before reaching the end of the enclosure and coupling with the other propagating optical signals. In one embodiment, for a pulse width expansion of about twelve inches (i.e. 12 in.) the corresponding aggregate fiber lengths or pathways would be within +/− three inches (i.e. 3 in.) of one another.

Still referring to FIG. 2, an optical coupler 280 (e.g. N to 1 optical summing coupler) receives at input 282 the intensity modulated output pulse signals Sa, Sb, Sc, Sd which are temporally aligned with one another from each of the plurality of output optical fibers (Mo1–Mo4), and integrates the optical intensity to generate a summed output signal 290 at output 284 for input to another optical device 295 at a single input of the device. In an exemplary embodiment, the optical device may comprise another optical fiber or may alternatively be a photodetector, for example. In an illustrative embodiment the light pulses may be coherent light emanating from a laser light source, or may comprise non-coherent light. The fibers may comprise single-mode optical fibers or may be multi-mode fibers.

Figure 5:
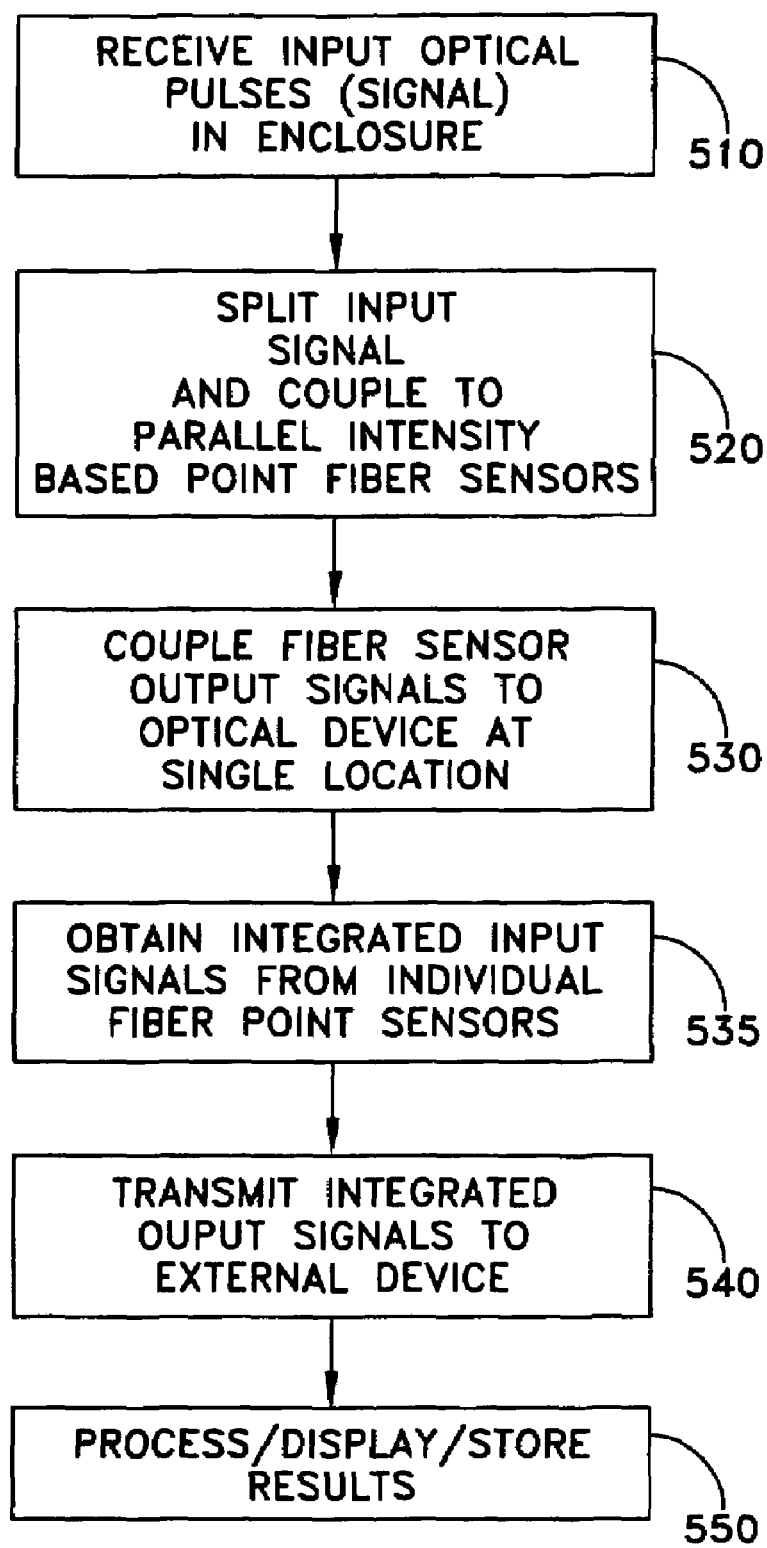
FIG. 5 is an exemplary flowchart illustrating a method for integrating optical signals received in an extended optical sensor according to an aspect of the present invention.

Referring to FIG. 2, in conjunction with the flow diagram of FIG. 5, operation of an embodiment of the present invention is as follows. An optical signal 215 (FIG. 2) comprising a series of optical pulses carried via optical fiber 240 to extended sensor enclosure input end (step 510 of FIG. 5). Optical coupler 210 operates to divide the input signal 215 into a plurality of parallel input optical signals 215' conveyed via a corresponding series of parallel optical pathways (Mi1–Mi4, Mo1–Mo4) through respective associated intensity based point sensors 240a–d that are equally spaced from one another and positioned at designated locations along the enclosure. The aggregate optical path lengths associated with each point sensor are substantially the same, or differ only in accordance with the relative position of the associated optical sensor within the enclosure so as to compensate for propagation delays of the optical signal through the respective optical sensor and associated aggregate path length to enable each of the intensity modulated optical signals, upon input to optical coupler 280, to be temporally aligned with one another (step 520).

Each point sensor receives the input light pulses of optical signal 215' via a corresponding optical fiber input line (e.g. Mi1) and generates an intensity modulated output optical signal (e.g. Sa) indicative of a sensed acoustic parameter. The output optical signal is carried via a corresponding optical fiber output line (e.g. Mo1) and focused onto a single optical fiber 295. Each of the optical fiber sensors 240a–d have optical pathways (in aggregate, e.g. Mi1+Mo1) of substantially the same length within the extended sensor enclosure so as to provide a plurality of intensity modulated optical output signals (i.e. Sa, Sb, Sc, Sd) temporally aligned with one another and incident into N to 1 optical coupler 280 (step 530) for generating onto the fiber 295 an output pulse 290 indicative of the aggregation of each of pulses Sa–Sd (step 535). Each of the intensity modulated output light pulses 290a, 290b, etc (see FIG. 3) corresponds to a respective one (e.g. $215_1$, $215_2$, $215_3$,) of the input optical signals input to the extended sensor. The output optical intensity modulated summed signals may be carried via fiber 295 to receiver unit 38 (FIG. 1) on platform 16 (step 540) where the signals are processed and results stored and/or displayed (step 550).

FIG. 3 shows a more detailed representation of an arrangement for coupling each of the temporally aligned output signals of optical fibers Mo1–Mo4 into another optical device such as single fiber 295 (see FIG. 2). In the exemplary embodiment shown, the output fibers are bundled together and arranged such that the corresponding output pulses from each fiber are incident onto a focusing lens 285 of optical coupler 280 for aggregating the temporally aligned pulses for input at face 202 of fiber 295. In this manner, the output signal pulse (e.g. 290a) onto fiber 295 represents the summation of all the individual point sensor pulses Sa–Sd. A holder or clamp (not shown) may be used to secure the lens between the output fibers and fiber 290.

Figure 4:
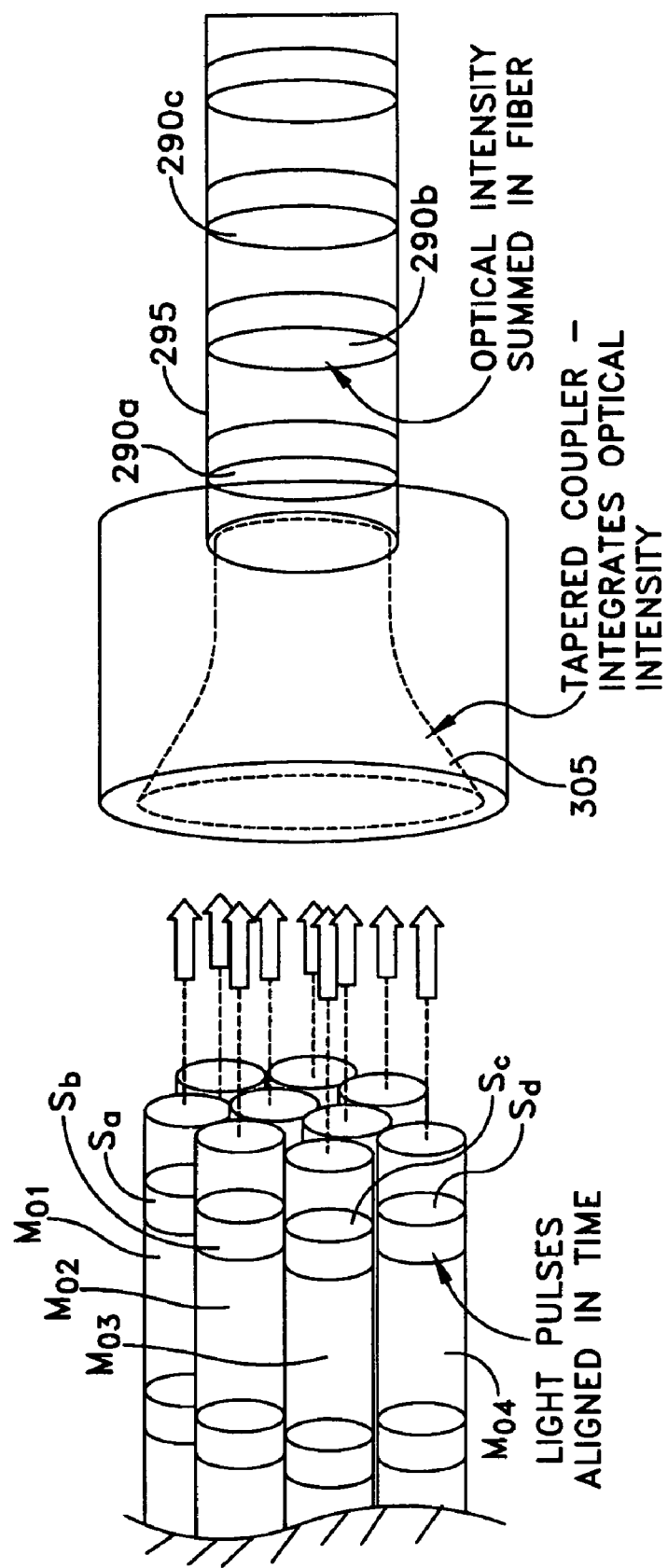
FIG. 4 is another exemplary illustration of a coupling arrangement according to another aspect of the present invention.

FIG. 4 shows a detailed representation of another arrangement for coupling each of the temporally aligned output signals of optical fibers Mo1–Mo4 into single fiber 295. In the exemplary embodiment shown, a tapered optical coupler 305 or other coupling arrangement at the output ends of the optical fibers may implement focusing lens 285 (see FIG. 3) for receiving the output signals and directing these signals onto another optical device, such as fiber 295 (or alternatively, a photodetector).

Figure 6:
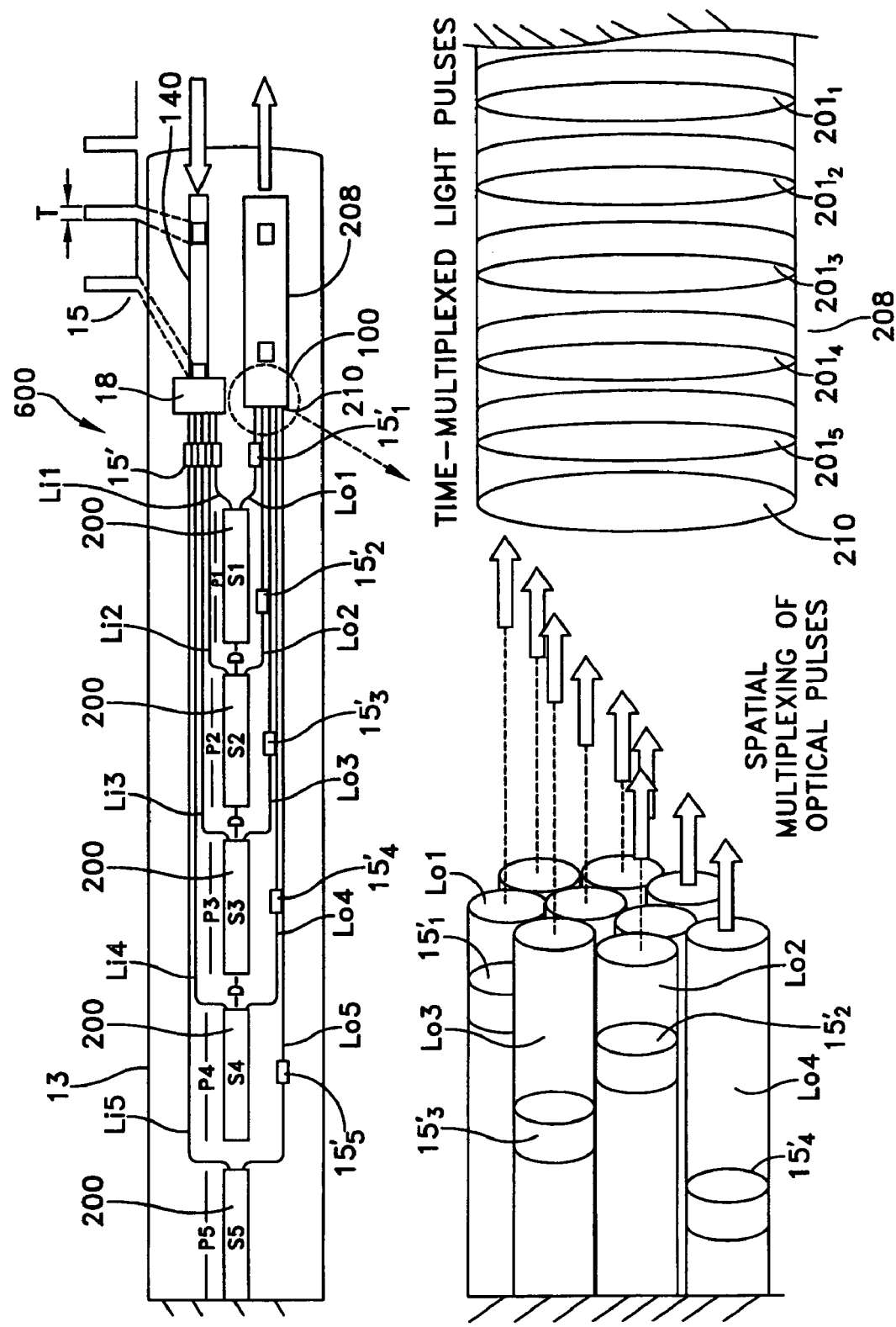
FIG. 6 is another configuration wherein the extended optical sensor comprising a series of individual intensity modulated point sensors may be incorporated into a time division multiplexing arrangement of such extended sensors for an optical sensor system.

In another configuration, the extended optical sensor 200 (see FIG. 2) may be incorporated into a time division multiplexing arrangement for an optical sensor system 600 as shown in FIG. 6. In this configuration, each of the plurality of optical fiber sensors (S1, S2, S3, S4, S5) is the same extended optical sensor 200 shown in FIG. 2, with each sensor containing a plurality of intensity based point sensors as discussed previously. Each sensor 200 is operative for receiving light pulses at an input thereof via corresponding one of input lines Li1, Li2, Li3, Li4, Li5 and for sensing acoustic pressure and causing a change in the intensity modulated characteristic of the light pulses transmitted therethrough indicative of the sensed pressure. Here, each extended optical fiber sensor has an associated different path length corresponding to a different propagation delay time of the light pulses through that optical fiber (i.e. through distances Li1+Lo1, Li2+Lo2, Li3+Lo3, Li4+Lo4, Li5+Lo5). A coupling arrangement 100 imparts the output time delayed pulse signals ($15'_1$, $15'_2$, ... $15'_5$) averaged from each of the extended sensors into another optical device 208 such as a single or multi-mode optical fiber, at a single input of the another optical device, so as to provide a series of time multiplexed, averaged output light pulses $201_5$, $201_4$, $201_3$, $201_2$, $201_1$ propagating through fiber 208 for subsequent processing (e.g. back to the platform receiving unit).

Still referring to FIG. 6, in an exemplary embodiment, the pulse length T of the pulses input to each of the plurality of extended optical fiber sensors 200 (via splitter 18 from input fiber optic cable 140) is less than the difference in propagation time between consecutively positioned sensors. The pulse length is dependent on the difference in path lengths between consecutive sensors, which depends upon the acoustic frequency of interest. In general, the higher the frequency, the shorter the spacing between the extended sensors 200, and hence the shorter the pulse length needed in order to be able to resolve the sensor output signals in time. This can be expressed as Tp=Ca/(f*Cl), where Tp is the pulse length, Ca is the speed of sound in the acoustic medium (e.g. water), f is the highest frequency of interest, and Cl is the speed of light in the optical medium (e.g. fiber), and assuming a one half wavelength ($\lambda/2$) sensor spacing.

Although illustrated and described herein with reference to certain specific embodiments, the present invention is nevertheless not intended to be limited to the details shown. For example, while the light source has been illustrated at the location of the tow platform, it is also contemplated that such device may reside at other remote locations, including, for example, within towed array cable 13. Various other modifications may be made in the details within the scope and range of equivalents of the claims and without departing from the spirit of the invention.

What is claimed is:
1. An extended optical sensor comprising:
   a plurality of intensity-based optical point sensors spaced apart from one another at designated positions along a length of cable, each point sensor comprising:
   an input coupled to a respective first optical pathway conveying an optical signal to the input of said point sensor, and
   an output for providing an intensity modulated output optical signal indicative of a sensed environmental condition, said output of each sensor coupled to a respective second optical pathway conveying each intensity modulated output optical signal to an output end thereof; and
   an optical coupler having an input for receiving the intensity modulated output optical signals from each of the output ends of the second optical pathways and an output for providing an output signal indicative of the aggregate of the intensity modulated output optical signals, wherein the first and second optical pathways coupled to a respective optical sensor signal have a combined total path length that differs from the combined total path lengths of the other first and second optical pathways in accordance with the position of the associated optical point sensor to compensate for propagation delays of the optical signal through the respective optical sensor and associated first and second optical pathways such that each of the intensity modulated optical signals, upon input to the coupler, are temporally aligned with one another.

2. An extended optical sensor according to claim 1, further comprising an optical coupler disposed near an input end of said cable for receiving an optical signal input to said cable and an outputting to each of said first optical pathways said same optical signal.

3. An extended optical sensor according to claim 2, wherein the optical coupler comprises a 1 to N optical splitter device.

4. An extended optical sensor according to claim 1, wherein each of the first optical pathways have different path lengths in accordance with the position of the associated optical sensor to provide the same optical signal to the input of each said optical sensor at substantially the same time, and wherein the second optical pathways have different path lengths in accordance with the position of the associated optical sensor along the cable serves to provide the intensity modulated optical signals input to the coupler at substantially the same time.

5. An extended optical sensor according to claim 1, wherein the optical coupler comprises an N to 1 optical summing coupler device.

6. An extended optical sensor according to claim 1, wherein the optical coupler includes a focusing lens arrangement between the output ends of each of the second optical pathways and the input and of another optical pathway for integrating the optical intensity of each of the temporally aligned intensity modulated optical signals onto another optical pathway.

7. An extended optical sensor according to claim 1, wherein the optical coupler comprises a tapered coupler for integrating the optical intensity from each of the intensity modulated optical signals.

8. An extended optical sensor according to claim 1, wherein each of the first and second optical pathways comprises respective optical fibers.

9. An extended length optical sensor comprising:

an elongated housing having an input and an output;

a plurality of intensity based optical point sensors equally spaced from one another about the length of the housing, each said sensor responsive to an optical signal conveyed via a respective optical fiber disposed within said housing, each said sensor providing an intensity modulated output optical signal indicative of a sensed environmental condition, the output of each said sensor coupled to a respective second optical fiber conveying said intensity modulated output optical signal to an optical coupler disposed near the output of said elongated housing, wherein the total optical path lengths associated with each of the optical point sensors are substantially equal such that the output modulated signal from each respective second optical fiber is temporally aligned with one another for input to said coupler.

10. An extended optical sensor according to claim 9, wherein said housing comprises an undersea cable.

11. An extended optical sensor according to claim 9, wherein said optical coupler comprises a star coupler.

* * * * *